(12) United States Patent
Davies et al.

(10) Patent No.: US 6,443,306 B1
(45) Date of Patent: Sep. 3, 2002

(54) STORAGE CASE FOR MULTIPLE REMOVABLE MEMORY CARDS

(75) Inventors: Peter Davies, Webster; Donald J. Appleton, Penfield; Jeffery T. Matteson, Wyoming; Barbara A. Sayers, Victor, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/712,535

(22) Filed: Nov. 14, 2000

(51) Int. Cl.[7] .............................................. B65D 73/00
(52) U.S. Cl. ...................... 206/473; 206/307; 206/523
(58) Field of Search ............................. 206/307, 307.1, 206/308.1, 312, 387.13, 473, 456, 523, 308.3

(56) References Cited

U.S. PATENT DOCUMENTS

| | | | | |
|---|---|---|---|---|
| 4,002,355 A | * | 1/1977 | Sendor | |
| 5,320,223 A | * | 6/1994 | Allen | 206/523 |
| 5,645,165 A | * | 7/1997 | Taniyama | 206/308.1 |
| 5,669,499 A | * | 9/1997 | Chen | 206/387.1 |
| 5,727,680 A | * | 3/1998 | Liu | 206/308.1 |

* cited by examiner

Primary Examiner—David T. Fidei
(74) Attorney, Agent, or Firm—Mark G. Bocchetti

(57) ABSTRACT

A storage case for small format memory cards is taught which utilizes those sections of known and existing computer furniture specifically designed to receive compact disc jewel cases to thereby allow for more reliable storage of small format memory cards. The storage case includes a compact disc jewel case without a disc retaining mechanism therein. A foam insert resides within the compact disc jewel case and has at least one precut cut-out section therein which is removable to provide at least one space in the foam insert to receive a small format memory card. The jewel case is preferably formed from a clear plastic material and there is preferably an insert sheet adapted to be retained proximate to a front wall of the jewel case. The insert sheet includes at least one punch-out section therein which corresponds to and aligns with the at least one precut cut-out section in the foam insert when the jewel case is closed thereby allowing a user to view and read the label on any small format memory cards residing in the CD jewel case without opening the case.

5 Claims, 3 Drawing Sheets

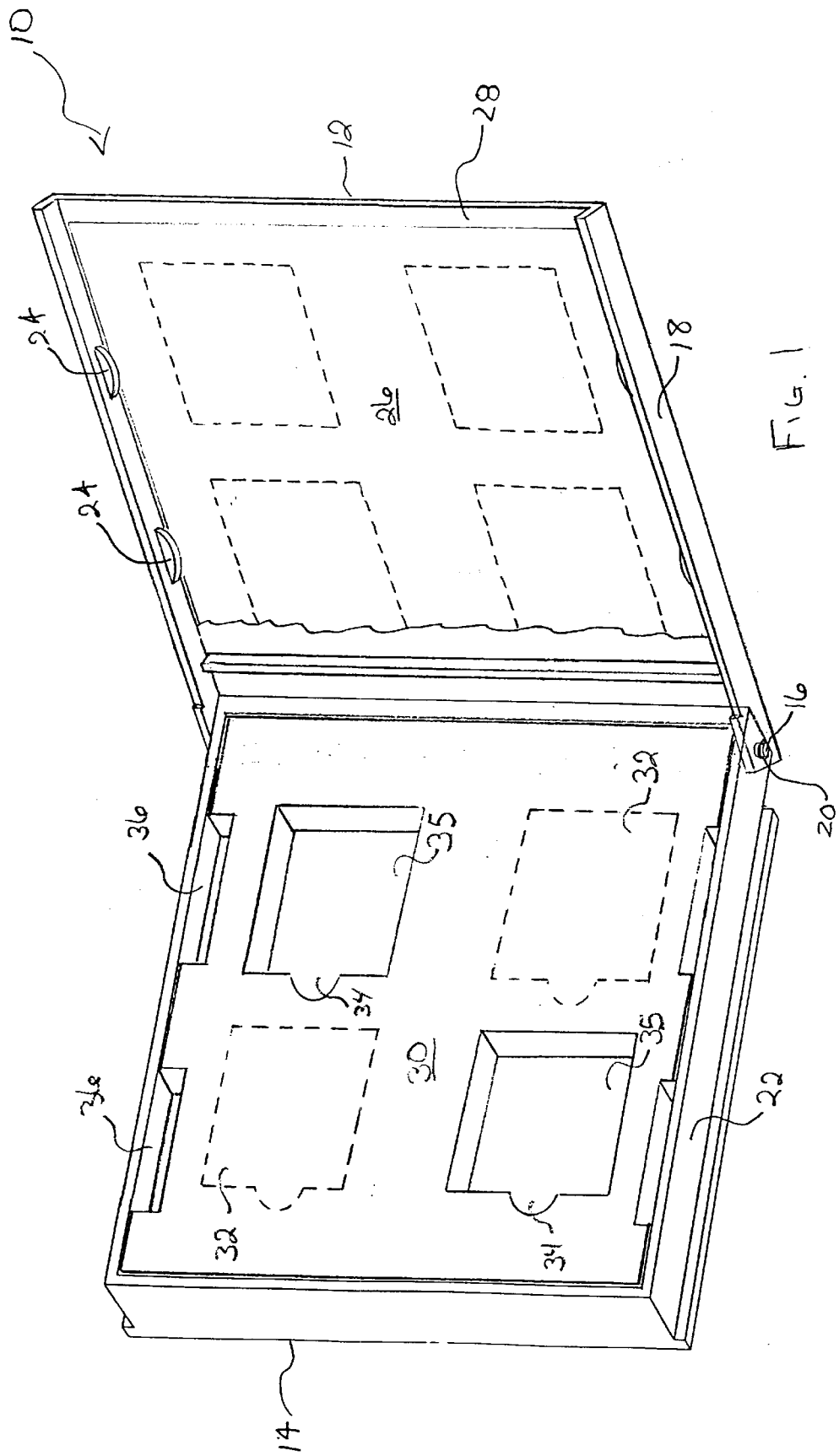

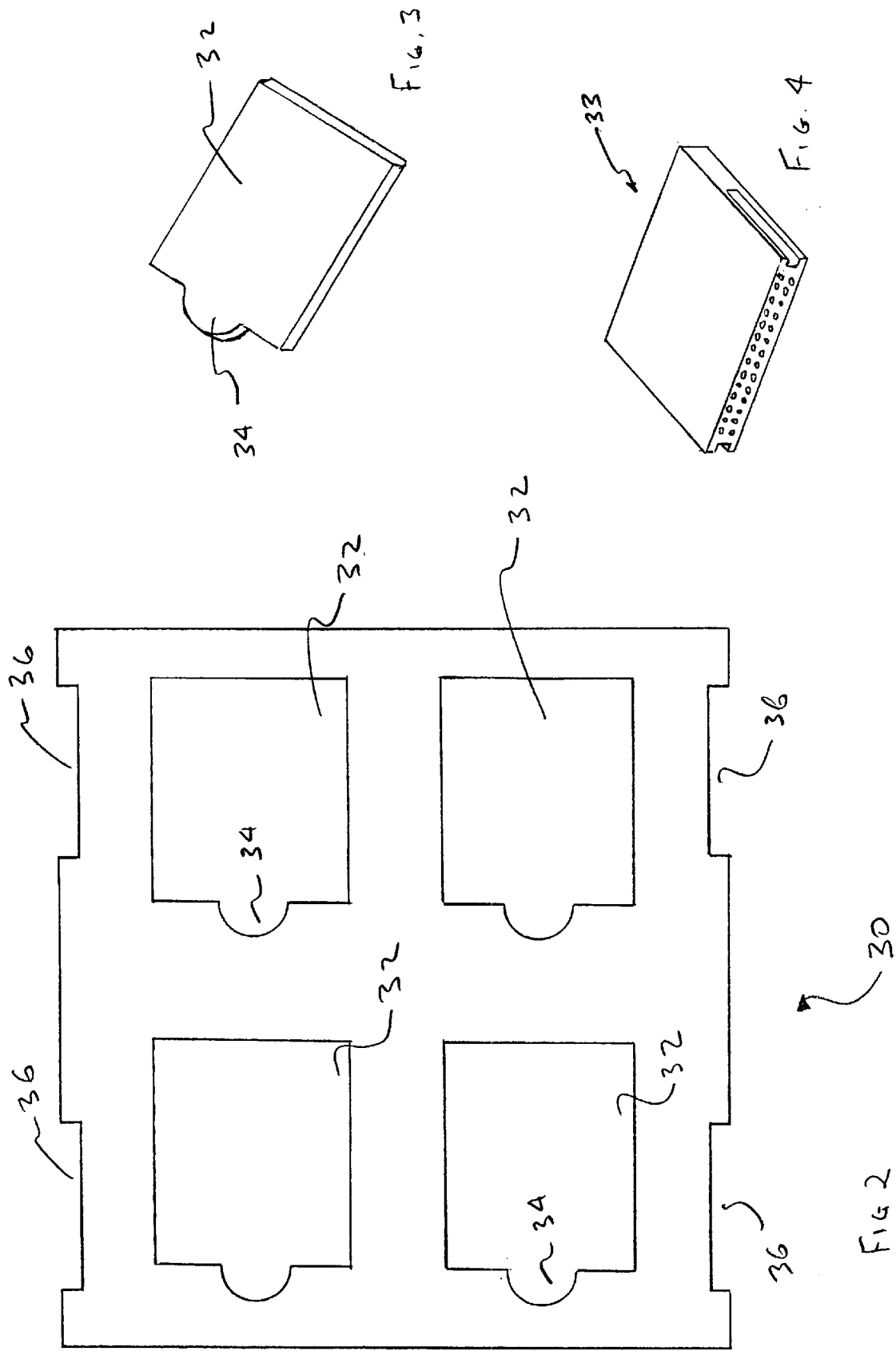

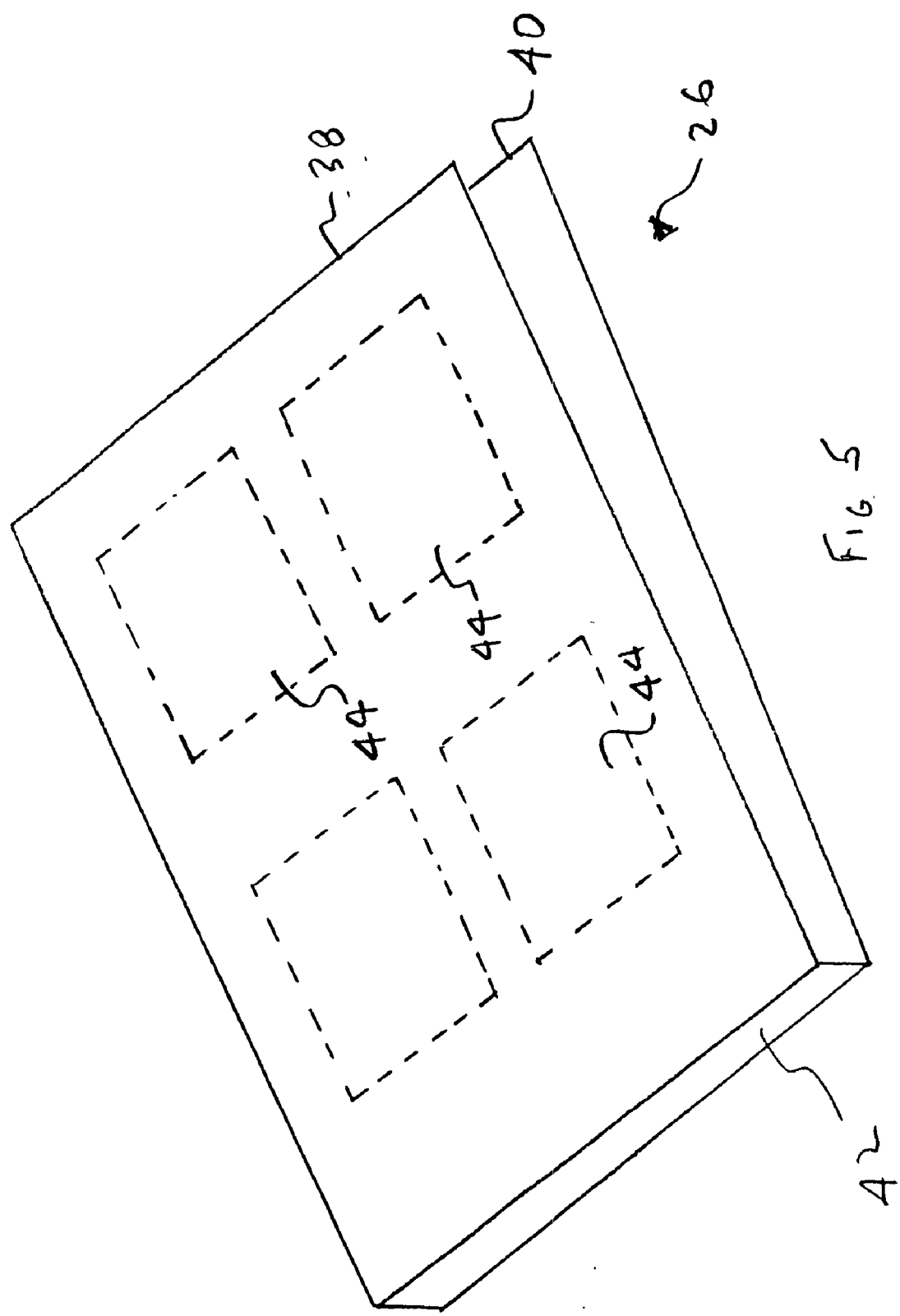

STORAGE CASE FOR MULTIPLE REMOVABLE MEMORY CARDS

FIELD OF THE INVENTION

The present invention relates generally to storage cases and, more particularly, to storage cases for small format memory cards for use with computers and other digital devices.

BACKGROUND OF THE INVENTION

A large variety of computer furniture is known in the prior art for supporting and/or housing computers and ancillary hardware. Often this furniture, in the form of desks, cabinets and shelving, includes one or more sections specifically designed to receive compact disc jewel cases. The compact discs, of course, contain information and/or software which can be accessed and used by the computer through a CD ROM player.

In addition to compact discs, a variety of other storage media is used in the operation of computers. The use of small format memory cards such as compact flash cards is becoming more and more prevalent. By way of example, many manufactures have developed digital cameras that produce digital images which are stored using a removable memory card. The removable memory cards normally utilize solid-state Flash EPROM memory to store the digital files. The Flash EPROM memory can be erased and reused. A user often has several, or even several dozen cards in order to store large numbers of images. In addition to being used in digital cameras, the removable memory cards are also used in some portable audio players such as "MP3" players. In addition, removable memory cards are used in small "palm-sized" personal computers. Further, there are removable memory cards available which are adapted to be received in a standard PCMCIA interface.

Various cases are known in the prior art to protect small format memory cards. Typically, these cases take the form of small flexible plastic, cloth or leather pouches that hold one or two cards, or hard plastic cases that hold a single card. Because these small format memory cards are small even when contained in one of the prior art cases, and because existing computer furniture does not include sections specifically designed to receive small format memory cards, they are susceptible to being lost or misplaced. Losing or misplacing a card not only results in the loss of the potentially expensive piece of storage media, but may also result in the irreplaceable loss of the information stored on the card. Thus, there is a need for a storage case for small format memory cards which will limit loss or misplacement of such cards.

SUMMARY OF THE INVENTION

It is therefore an object of the present invention to provide a storage case for small format memory cards which will limit loss or misplacement of such cards.

It is a further object of the present invention to provide a storage case for small format memory cards which utilizes those sections of known and existing computer furniture specifically designed to receive compact disc jewel cases.

Briefly stated, the foregoing and numerous other features, objects and advantages of the present invention will become readily apparent to those skilled in the art upon a review of the specification, claims and drawings set forth herein. These features, objects and advantages are accomplished by providing a compact disc jewel case without the capture mechanism for retaining a compact disc in the jewel case. The jewel case is preferably made from a clear plastic material. The jewel case is provided with a foam insert including precut cut-out sections spaced inwardly from the perimeter of the foam insert. The precut cutout sections are sized such that when removed from the foam insert, a small format memory card may be snugly inserted therein. The precut cut-out sections may also include a small arcuate portion to allow for finger insertion for easy removal of a small format memory card retained therein. In addition, the jewel case may be provided with a paper insert which is visible through the clear plastic of the jewel case. Such inserts are well known for displaying the title and various graphics on compact disc software products as well as on compact discs on which music is recorded. The paper insert may be pre-perfed or die-cut to contain punch-out sections therein which correspond to and align with the precut cut-out sections in the foam insert when the jewel case is closed. In such manner, when a user inserts a small format memory card into the precut cut-out section of the foam insert, the user can also remove the corresponding punch-out section in the paper insert so that the small format memory card is clearly visible and any information written thereon can be read without opening the jewel case. In this manner, small format memory cards can be stored in CD jewel cases which, in turn, can be safely placed in those sections of known and existing computer furniture specifically designed to receive compact disc jewel cases thereby significantly decreasing the probability of losing or misplacing such cards.

BRIEF DESCRIPTION OF THE DRAWINGS

FIG. 1 is a perspective view of the storage case of the present invention with the front housing thereof shown in the open position and with two of the pre-cut cutouts removed from the foam insert.

FIG. 2 is a top plan view of the foam insert adapted to be received and retained in the storage case and to provide locations for inserting small format memory cards therein.

FIG. 3 is a perspective view of a precut cut-out section of the foam insert.

FIG. 4 is a perspective view of an exemplary small format memory card.

FIG. 5 is a perspective view of the preferred insert cover sheet.

DETAILED DESCRIPTION OF THE INVENTION

Turning first to FIG. 1, there is shown a perspective view of a typical compact disc jewel case 10 with the exception that jewel case 10 does not include a compact disc retaining mechanism therein. Jewel case 10 is therefore a plastic case or container. The compact disc jewel case 10 (shown open) includes a front housing 12 pivotally connected to a rear housing 14. Typically, the pivot connection is made utilizing pins 16 which are integrally formed with and extend from the sidewalls 18 of the front housing 12. Pins 16 snap fit into orifices 20 formed in the sidewalls 22 of rear housing 14. In such manner, front housing 12 can be pivoted away from rear housing 14 to thereby open the jewel case 10 allowing a user access to the contents thereof. The jewel case 10 may further include retaining tabs 24 extending in relief from sidewalls 18 for retaining an insert cover paper 26 within the jewel case 10 such that at least a portion of the insert cover paper 26 is retained against or proximate to the front wall 28 of the front housing 12. In such manner, the insert cover paper 26 is always clearly visible through the front wall 28 and will not readily separate from the front wall 28 when the jewel case 10 is opened. The size of the jewel case 10 is approximately 140 mm (wide) by 125 mm (long) by 10 mm (thick). The front housing 12 of jewel case 10 is transparent and, preferably the rear housing 14 is transparent as well.

There is a foam insert 30 adapted to be received and retained in jewel case 10. Foam insert 30 includes precut cut-out sections 32. Each precut cut-out section 32 is generally rectangular and sized to approximate a small format memory card 33. Each precut cut-out section 32 preferably also includes the arcuate extension 34. Each precut cut-out section 32 is preferably left in place in the foam insert 30 until user wants to remove it to provide a space 35 for insertion of a small format memory card 33 therein (see FIG. 4). Of course, the precut cutout sections 32 can also be removed when the foam insert 30 is produced, so that the user does not need to remove and dispose of the precut cut-out sections 32. Foam insert 30 also preferably includes side edge recesses 36. Side edge recesses 36 allow for non-interfering fit between retaining tabs 24 and foam insert 30 when jewel case 10 is closed.

The dimensions of the pre-cut sections 32 are sized to accommodate a particular memory card 33. There are several different small format memory card formats with different dimensions. The memory card formats include CompactFlash cards, adapted to the Compact Flash interface standard, described in the CompactFlash Specification Version 1.3, published by the CompactFlash Association, Palo Alto, Calif., Aug. 5, 1998. CompactFlash cards have dimensions of approximately 42 mm×36 mm×3 mm. The memory card formats also include "PC cards", having dimensions of approximately 85 mm×54 mm×3 mm, as described in the PC Card Standard, Release 2.0, published by the Personal Computer Memory Card International Association, Sunnyvale, Calif., Sep. 1991. The memory card formats also include the "SD" (Secure Digital) memory card having dimensions of approximately 32 mm×24 mm×2.1 mm. The memory card formats also include the "SSFDC" (Solid State Floppy Disc Card) memory card, also known as "SmartMedia", having dimensions of approximately 45 mm×37×0.5 mm. The memory card formats also include the "Memory Stick" format recently introduced by Sony.

Turning next to FIG. 5, there is shown a perspective view of the preferred insert cover sheet 26 to be used in the practice of the present invention. The insert cover sheet 26 includes a front sheet portion 38 adapted to be retained against or proximate to the front wall 28 by retaining tabs 24. The insert cover sheet 26 may also include a rear sheet portion 40 and an interconnecting folded hinge section 42. The insert cover sheet 26 is preferably pre-perfed to contain punch-out sections 44 therein which correspond to and align with the precut cutout sections 32 in the foam insert 30 when the jewel case 10 is closed. If the insert cover sheet 26 also includes a rear sheet portion 40, the rear sheet portion 40 will reside within the jewel case 10 and beneath the foam insert 30.

When a user desires to safely store a small format memory card 33, the user need merely remove one of the precut cut-out sections 32 of the foam insert 30 residing in jewel case 10. After removing the precut cut-out section 32, the user may then insert the small format memory card 33 into the space 35 created in the foam insert 30. Note that the space 35 includes the arcuate section extending beyond the small format memory card 33 which allows the user a place to insert a finger therein to easily facilitate removal of the small format memory card 33 from the space 35. The user can also remove the corresponding punch-out section 44 in the paper insert 26 so that the small format memory card 33 is clearly visible and any information written thereon can be read without opening the jewel case 10. In this manner, small format memory cards 33 can be stored in CD jewel cases 10 which, in turn, can be safely placed in those sections of known and existing computer furniture specifically designed to receive compact disc jewel cases thereby significantly decreasing the probability of losing or misplacing such cards.

From the foregoing, it will be seen that this invention is one well adapted to obtain all of the ends and objects hereinabove set forth together with other advantages which are apparent and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in a limiting sense.

PARTS LIST 10 compact disc jewel case
12 front housing
14 rear housing
16 pins
18 sidewalls
20 orifices
22 sidewalls
24 retaining tabs
26 insert cover paper
28 front wall
30 foam insert
32 precut cut-out sections
33 small format memory card
34 arcuate section
35 space
36 side edge recess
38 front sheet portion
40 rear sheet portion
42 interconnecting folded hinge section
44 pre-perfed punch-out sections

What is claimed is:

1. A storage case for small format memory cards comprising:

(a) a plastic container including at least a front housing pivotally connected to a rear housing, at least the front housing being formed from a clear plastic material;

(b) a foam insert residing within the plastic container;

(c) at least one precut cut-out section in the foam insert, the at least one precut cut-out section being removable to provide at least one space in the foam insert to receive a small format memory card;

(d) an insert sheet adapted to be retained proximate to the front housing of the plastic container, and (e) at least one punch-out section in the insert sheet, the at least one punch-out section corresponding to and aligning with the at least one precut cut-out section in the foam insert when the plastic container is closed.

2. A storage case as recited in claim 1 wherein:

there are at least two precut cut-out sections in the foam insert.

3. A storage case for small format memory cards comprising:
- (a) a plastic container including at least a front housing pivotally connected to a rear housing, at least the front housing being formed from a clear plastic material;
- (b) a foam insert residing within the jewel case;
- (c) at least two precut cut-out sections in the foam insert, the at least two precut cut-out sections being removable to provide at least two spaces in the foam insert to each receive a small format memory card;
- (d) an insert sheet adapted to be retained proximate to the front housing of the plastic container; and
- (e) at least two punch-out sections in the insert sheet, the at least two punch-out sections corresponding to and aligning with the at least two precut cut-out sections in the foam insert when the plastic container is closed.

4. A storage case as recited in claim 3 wherein each precut cut-out section includes a rectangular potion have dimensions of approximately 42 mm×36 mm to receive a CompactFlash format card.

5. A storage case as recited in claim 3 wherein each precut cut-out section includes a rectangular potion have dimensions of approximately 32 mm×24 mm to receive an SD format card.

* * * * *